US012592585B2

(12) United States Patent (10) Patent No.: US 12,592,585 B2
Cai (45) Date of Patent: Mar. 31, 2026

(54) WIRELESS CHARGER

(71) Applicant: SHENZHEN DEONE INNOVATION TECHNOLOGY CO., LTD, Shenzhen (CN)

(72) Inventor: Jiongjun Cai, Shenzhen (CN)

(73) Assignee: SHENZHEN DEONE INNOVATION TECHNOLOGY CO., LTD, Shenzhen (CN)

( * ) Notice: Subject to any disclaimer, the term of this patent is extended or adjusted under 35 U.S.C. 154(b) by 740 days.

(21) Appl. No.: 18/053,380

(22) Filed: Nov. 8, 2022

(65) Prior Publication Data

US 2023/0327484 A1 Oct. 12, 2023

(30) Foreign Application Priority Data

Apr. 12, 2022 (CN) .......................... 202220830862.7

(51) Int. Cl.
H02J 50/00 (2016.01)
H02J 50/10 (2016.01)
(52) U.S. Cl.
CPC ............ H02J 50/005 (2020.01); H02J 50/10 (2016.02)
(58) Field of Classification Search
CPC ............................... H02J 7/0042; H02J 7/0044

USPC ......................................................... 320/108
See application file for complete search history.

(56) References Cited

U.S. PATENT DOCUMENTS

| | | | |
|---|---|---|---|
| 10,274,814 B2 * | 4/2019 | Jeon ...................... | F16M 13/022 |
| 2012/0275094 A1 * | 11/2012 | Zhou ...................... | F16M 11/10 |
| | | | 361/679.01 |
| 2020/0297103 A1 * | 9/2020 | Jang ....................... | A45C 11/00 |
| 2022/0045398 A1 * | 2/2022 | Havskjold ............... | H01F 27/36 |

* cited by examiner

*Primary Examiner* — Ahmed H Omar
(74) *Attorney, Agent, or Firm* — HOWARD M COHN and Associates, LLC

(57) ABSTRACT

The present disclosure provides a wireless charger configured to charge electronic equipment, including a housing, a fixing component, a coil module, and an adjusting assembly. The housing includes a top housing and a bottom housing. The top housing is opposite to the bottom housing. The top housing faces the electronic equipment. An opening portion is formed on the bottom housing. The fixing component is accommodated in the housing. The coil module is disposed between the top housing and the fixing component. The adjusting assembly is at least partially slidably connected between the bottom housing and the fixing component. The adjusting assembly has a closed form and an open form relative to the opening portion. The present disclosure enriches use forms of the wireless charger by disposing the adjusting assembly, thus meeting using requirements for the wireless charger in different scenes.

10 Claims, 9 Drawing Sheets

100

100

100

WIRELESS CHARGER

TECHNICAL FIELD

The present disclosure relates to a technical field of wireless chargers, and in particular to an angle-adjustable wireless charger.

BACKGROUND

Conventional smart phones, smart watches, tablets, and other electronic equipment are constantly updated and iterated. However, when using the electronic equipment, users often face problems of unable to find a suitable data line in time, preparing data lines with different interfaces mismatch between the data lines and the charging interfaces, etc. Therefore, the users have urgent needs for wireless chargers, so the users do not need to directly connect the data lines to the electronic equipment.

When a conventional wireless charger charges the electronic equipment, there are two charging modes of which the conventional wireless charger is in a horizontal form or the conventional wireless charger is in a vertical form. When the conventional wireless charger in the horizontal form is used, the electronic equipment must be horizontally placed accordingly, which makes the electronic equipment poor in visual angle and is not convenient for the users to watch movies, make video calls and so on while charging. Meanwhile, when the conventional wireless charger in the horizontal form is used, a large desktop space is required. If the desktop is cluttered and crowded, the electronic equipment placed on the conventional wireless charger is prone to movement and misalignment due to a slight touch of external forces, resulting in low charging efficiency or even inability to continue charging. However, the conventional wireless charger in the vertical form is not easy to carry due to poor storage performance and large space occupation.

The conventional wireless chargers are only configured to charge the electronic equipment in either horizontal or vertical form, resulting in poor user experience. Although a wireless charger that can be used in both horizontal form and vertical from has been introduced in the market, which is convenient for the users to use, use angle of the wireless charger is too single to meet requirements of more visual angles and use scenarios.

SUMMARY

In order to solve above disadvantages, the present disclosure provides a wireless charger, which enriches use forms of the wireless charger by disposing an adjusting assembly, thus meeting use requirements of a user in different scenes.

The present disclosure provides the wireless charger configured to charge electronic equipment, including: a housing, a fixing component, a coil module, and an adjusting assembly. The housing includes a top housing and a bottom housing. The top housing is opposite to the bottom housing. The top housing faces the electronic equipment. An opening portion is formed on the bottom housing. The fixing component is accommodated in the housing. The coil module is disposed between the top housing and the fixing component. The adjusting assembly is at least partially slidably connected between the bottom housing and the fixing component. The adjusting assembly has a closed form and an open form relative to the opening portion.

Furthermore, the adjusting assembly includes a sliding component and a supporting component. The sliding component is connected to the supporting component. The supporting component is pivotable relative to the sliding component.

Furthermore, a plurality of limiting grooves is defined on the fixing component facing the opening portion. An elastic telescopic component is disposed on the sliding component facing the fixing component. The elastic telescopic component is embedded and fixed to any one of the plurality of limiting grooves, so that the sliding component is suspended and limited in any one of the plurality of limiting grooves in a sliding process. Alternatively, a plurality of elastic telescopic components is disposed on the fixing component facing the opening portion. A limiting groove is defined on the sliding component facing the fixing component. The limiting groove is embedded and fixed to any one of the plurality of elastic telescopic components, so that the sliding component is suspended and limited by any one of the plurality of elastic telescopic components in the sliding process.

Furthermore, the sliding component is suspended and limited in any one of the plurality of limiting grooves or the sliding component is suspended and limited by any one of the plurality of elastic telescopic components. The supporting component has the closed form and the open form relative to the opening portion.

Furthermore, a first matching portion is disposed on the sliding component, and a second matching portion is disposed on the supporting component. The second matching portion is matched with the first matching portion so as to limit the supporting component in the open form.

Furthermore, when the supporting component is switched from the closed form to the open form, the supporting component pivots outwards in a range of 0-120 degrees, and at least one pivoting angle enables the supporting component to be in the open form.

Furthermore, the supporting component is pivoted outwards by 60 degrees to be switched from the closed form to the open form.

Furthermore, one end, away from the sliding component, of the opening portion runs through the bottom housing, so that when the supporting component is in the closed form relative to the opening portion, the sliding component drives the supporting component to slide downwards.

Furthermore, the fixing component is fixed to the bottom housing so as to form a sliding groove between the fixing component and the bottom housing. The sliding component includes a base portion and a protruding portion. The protruding portion protrudes from the base portion. The base portion is clamped in the sliding groove and is slidable in the sliding groove. The protruding portion is accommodated in the opening portion.

Furthermore, a shape of the protruding portion and a shape of the supporting component are matched with a shape of the opening portion. When the base portion does not slide downwards, the protruding portion and the supporting component are accommodated in the opening portion.

Furthermore, a width of the supporting component is less than or equal to a width of the opening portion. When the sliding component does not slide, the supporting component is accommodated in the opening portion.

Furthermore, the sliding component and the supporting component do not extend out of an outer side surface of the bottom housing, so that the wireless charger is flatly placed on an external surface.

Compared with prior art, in the wireless charger of the present disclosure, by disposing the adjusting assembly at least partially slidably connected between the bottom housing and the fixing component, and by arrangement of the adjusting assembly having the closed form and the open form relative to the opening portion, a position of the adjusting assembly is able to be changed from two directions, which enriches the use forms of the adjusting assembly, thus meeting the requirements of the user for using the wireless charger in different scenes.

DETAILED DESCRIPTION

In order to facilitate better understanding of purpose, structure, features, efficacy and the like of the present disclosure, a wireless charger 100 of the present disclosure is further described in conjunction with drawings and specific embodiments.

Figure 1:
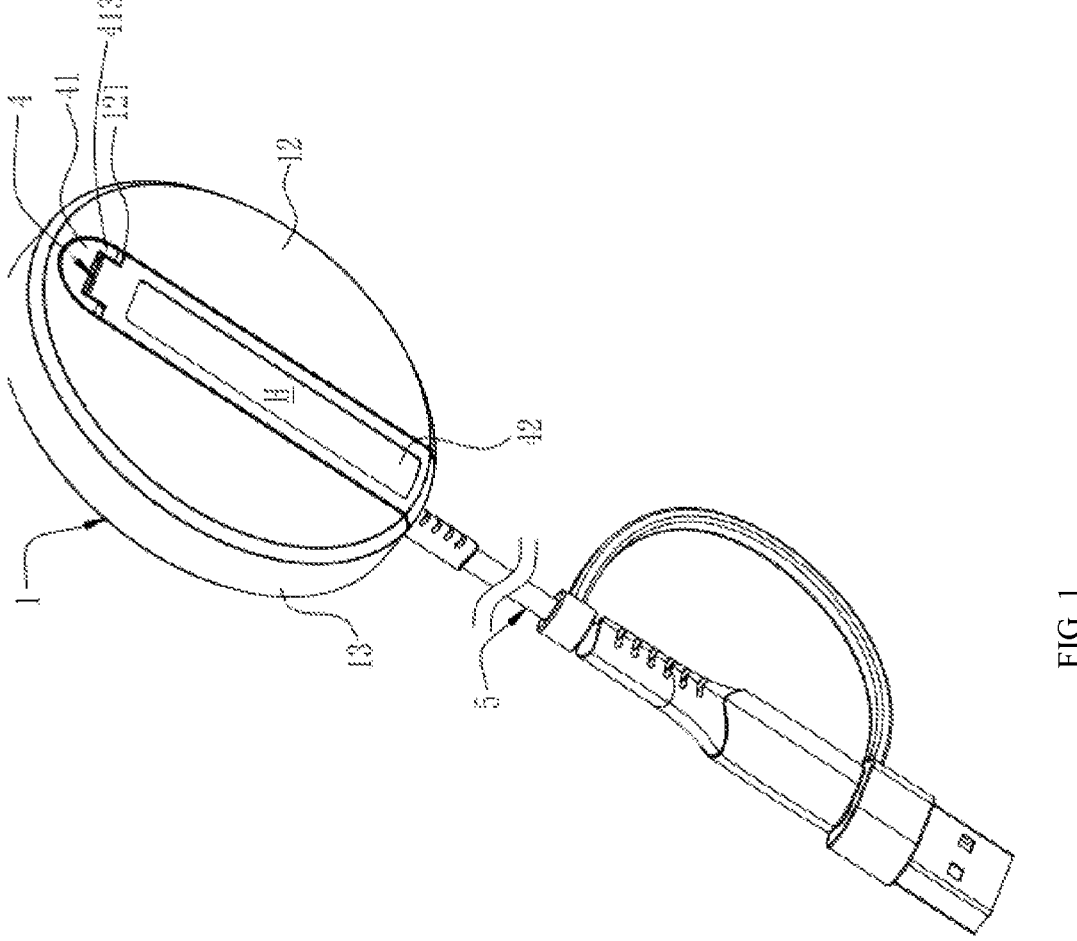
FIG. 1 is a perspective schematic diagram of a wireless charger in which a sliding component does not slide downwards and a supporting component is in a closed form according to one embodiment of the present disclosure.
Figure 2:
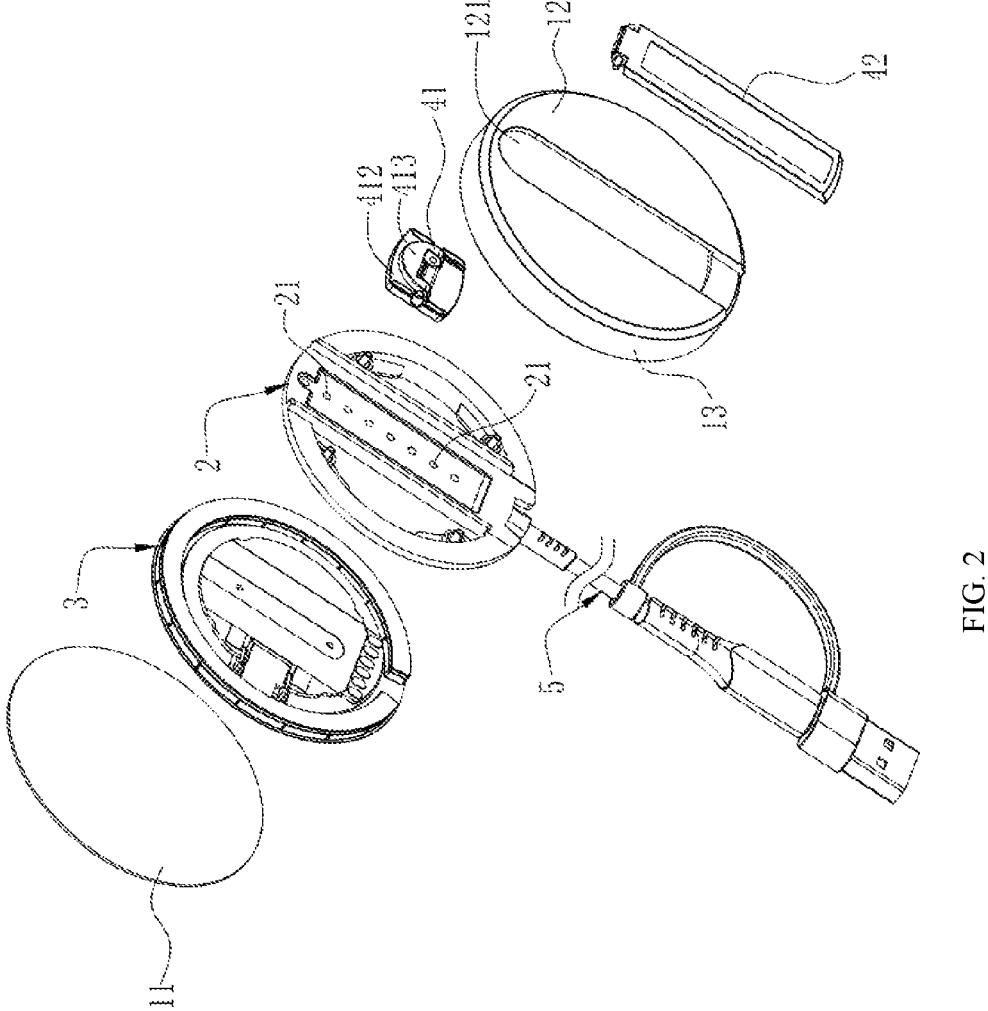
FIG. 2 is an exploded schematic diagram of FIG. 1.
Figure 3:
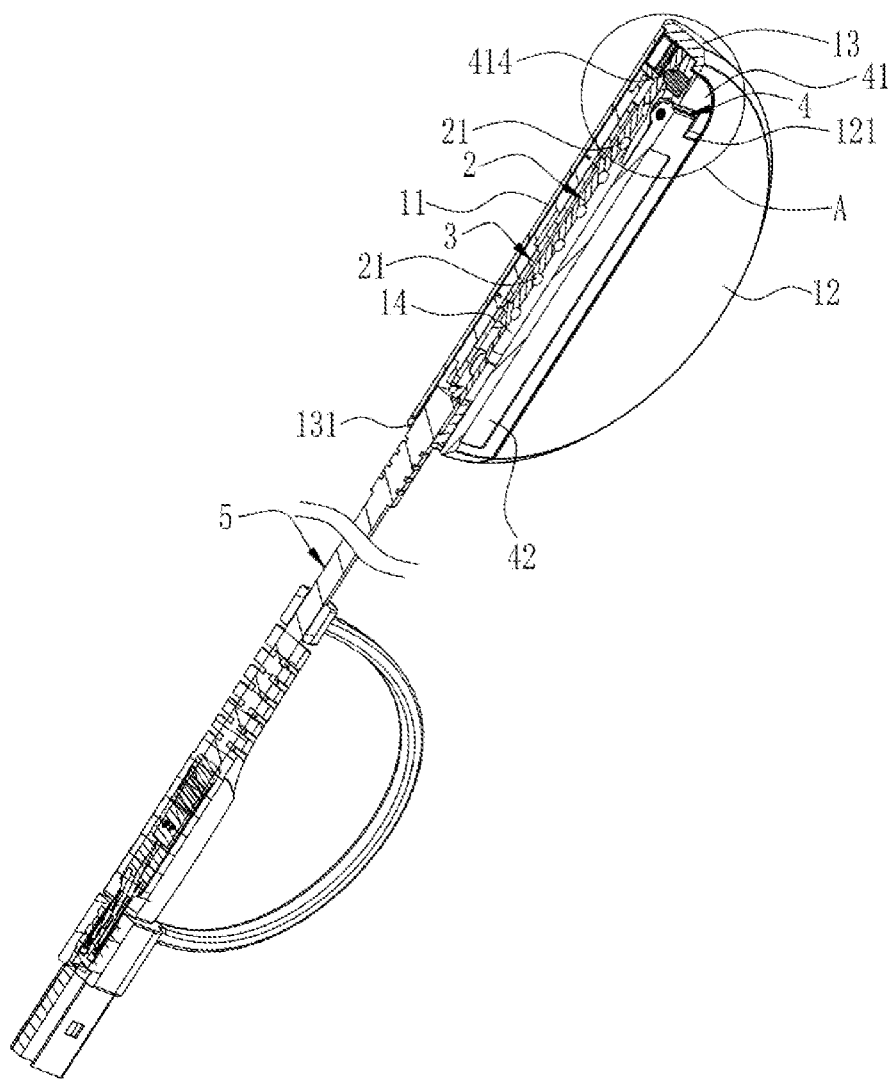
FIG. 3 is a cross-sectional schematic diagram of FIG. 1.

As shown in FIGS. 1-3, the present disclosure provides the wireless charger 100 configured to charge electronic equipment (not shown in the drawings). The wireless charger 100 includes a housing 1, a fixing component 2, a coil module 3, and an adjusting assembly 4. The fixing component 2, the coil module 3, and the adjusting assembly 4 are disposed on the housing 1. The housing 1 includes a top housing 11, a bottom housing 12, and a side wall 13. The top housing 11 is opposite to the bottom housing 12. The side wall 13 connects the top housing 11 with the bottom housing 12. The top housing 11 faces the electronic equipment. An opening portion 121 is formed on the bottom housing 12. A wire groove 131 is defined on the side wall 13. An electric wire 5 passes through the wire groove 131 and enters into the housing 1. A first end of the electric wire 5 is connected to the coil module 3. A second end of the electric wire 5 is connected to an external power supply (not shown in the drawings). The fixing component 2 is accommodated in the housing 1. The coil module 3 is disposed between the top housing 11 and the fixing component 2. The adjusting assembly 4 is at least partially slidably connected between the bottom housing 12 and the fixing component 2.

As shown in FIGS. 1-3, the fixing component 2 is fixed to the bottom housing 12. A distance between the fixing component 2 and the bottom housing 12 and a distance between the fixing component 2 and the top housing 11 are fixed. A sliding groove 14 is formed between the fixing component 2 and the bottom housing 12. In the embodiment, the fixing component 2 is fixed to the bottom housing 12 through screws. Certainly, in other embodiments, the fixing component 2 is fixed to the bottom housing 12 through a buckles fixing mode, an embedding fixing mode, etc., which are not limited thereto.

As shown in FIGS. 1, 2, 3, and 5, the adjusting assembly 4 has a closed form H and an open form K relative to the opening portion 121. Specifically, the adjusting assembly 4 includes a sliding component 41 and a supporting component 42. The sliding component 41 is connected to the supporting component 42. The supporting component 42 is pivotable relative to the sliding component 41. A width of the supporting component 42 is less than or equal to a width of the opening portion 121, so that the supporting component 42 has the closed form H and the open form K relative to the opening portion 121. In the embodiment, the supporting component 42 is pivotally connected to the sliding component 41 through a rotating shaft, where the rotating shaft is not marked in the figures. Certainly, pivoting manners between the supporting component 42 and the sliding component 41 are not limited thereto.

When the supporting component 42 is switched from the closed form H to the open form K, the supporting component 42 pivots outwards in a range of 0-120 degrees. Of course, the supporting component 42 pivots outwards in a range of 0-180 degrees or other ranges. At least one pivoting angle enables the supporting component 42 to be in the open form K. That is, one or more pivoting angles enabling the supporting component 42 to be in the open form K are provided. For example, a pivoting angle of 60 degrees enables the supporting component 42 to be in the open form K. Or, a pivoting angle of 60 degrees or 90 degrees enables the supporting component 42 to be in the open form K, which is not limited thereto. Optionally, the supporting component 42 is pivoted outwards by 60 degrees so as to be switched to the open form K from the closed form H. Certainly, according to actual requirements, when the supporting component 42 is switched to the open form K, the pivoting angle thereof can be selected from other angles.

Figure 4:
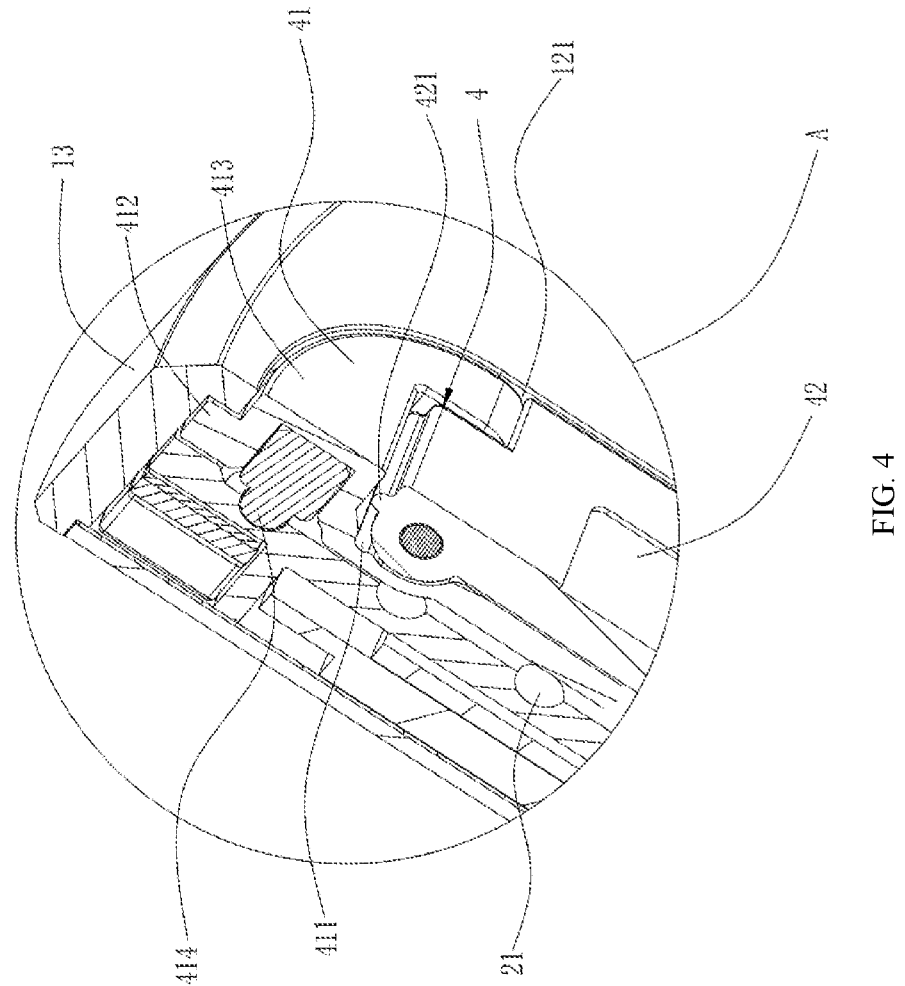
FIG. 4 is an enlarged schematic diagram of portion A shown in FIG. 3.
Figure 5:
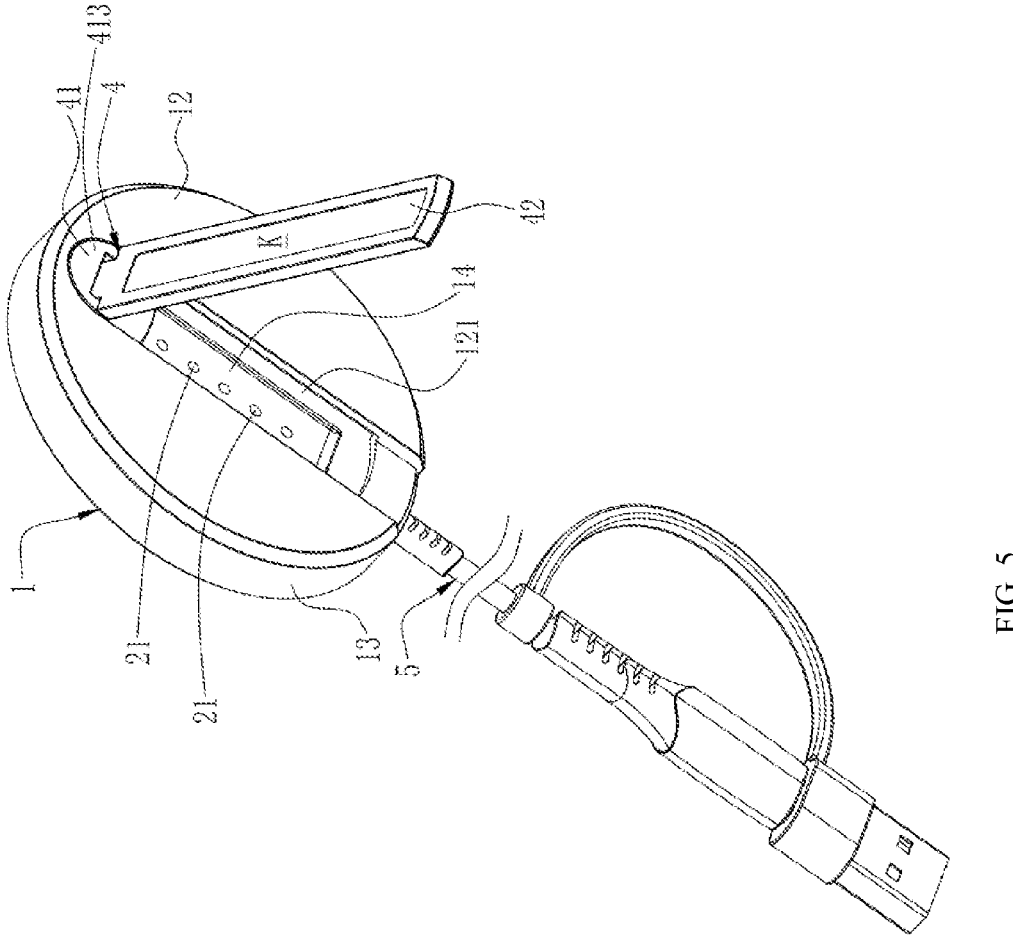
FIG. 5 is a perspective schematic diagram of the wireless charger in which the sliding component does not slide downwards and the supporting component is in an open form according to one embodiment of the present disclosure.

As shown in FIGS. 4-5, in order to further enable the supporting component 42 to be pivoted and positioned into the open form K, a first matching portion 411 is disposed on the sliding component 41, and a second matching portion 421 is disposed on the supporting component 42. The second matching portion 421 is matched with the first matching portion 411 so as to limit the supporting component 42 in the open form K. Specifically, the first matching portion 411 is a groove and the second matching portion 421 is a protrusion, which are not limited thereto. Certainly, it should be understood that a plurality of first matching portions 411 is disposed on the sliding component 41, or a plurality of second matching portions 421 is disposed on the supporting component 42, or a plurality of first matching portions 411 and a plurality of second matching portions 421 are disposed on the sliding component 41 and the supporting component 42, so that the supporting component 42 has a plurality of pivoting angles in the open form K. In other embodiments, the first matching portion 411 and the second matching portion 421 are not provided, and the supporting component 42 is freely stopped along with rotation in an outward pivoting process through damping force at a pivot joint of the supporting component 42 and the sliding component 41.

As shown in FIGS. 1-4, the sliding component 41 includes a base portion 412 and a protruding portion 413. The protruding portion 413 protrudes out of the base portion 412. The base portion 412 is clamped in the sliding groove 14 and is slidable in the sliding groove 14. The protruding portion 413 is accommodated in the opening portion 121. The supporting component 42 is pivotally connected to the sliding component 41, so that the sliding component 41 drives the supporting component 42 to slide simultaneously. One end, away from the sliding component 41, of the opening portion 121 runs through the bottom housing 12, so that when the supporting component 42 is in the closed form H relative to the opening portion 121, the sliding component 41 drives the supporting component 42 to slide downwards. In the embodiment, the width of the supporting component 42 is equal to the width of the opening portion 121, and a shape of the protruding portion 413 and a shape of the supporting component 42 are matched with a shape of the opening portion 121. When the base portion 412 does not slide downwards, the protruding portion 413 and the supporting component 42 are accommodated in the opening portion 121, which makes appearance of the wireless charger 100 very attractive. Moreover, the protruding portion 413 of the sliding component 41 and the supporting component 42 do not extend out of an outer side surface of the bottom housing 12, so that when the supporting component 42 is not in the open form K, the wireless charger 100 is flatly placed on an external surface.

As shown in FIGS. 2, 4, 5, and 6, in the embodiment, a plurality of limiting grooves 21 is defined on the fixing component 2 facing the opening portion 121. An elastic telescopic component 414 is disposed on the sliding component 41 facing the fixing component 2. The elastic telescopic component 414 is embedded and fixed to any one of the plurality of limiting grooves 21, so that the sliding component 41 is suspended and limited in any one of the plurality of limiting grooves 21 in a sliding process. Alternatively, a plurality of elastic telescopic components 414 is disposed on the fixing component 2 facing the opening portion 121. A limiting groove 21 is defined on the sliding component 41 facing the fixing component 2. The limiting groove 21 is embedded and fixed to any one of the plurality of elastic telescopic components 414, so that the sliding component 41 is suspended and limited by any one of the plurality of elastic telescopic components 414 in the sliding process. In the process that the sliding component 41 drives the supporting component 42 to slide, the sliding component 41 is suspended and positioned on any one of the plurality of limiting grooves 21, and the supporting component 42 has both of the closed form H and the open form K relative to the opening portion 121. Certainly, in other embodiments, a suspending and positioning mode between the sliding component 41 and the fixing component 2 may be in other forms, or suspending and positioning structures are arranged in an inner side of the sliding component 41 and an inner side of the bottom housing 12.

Figure 6:
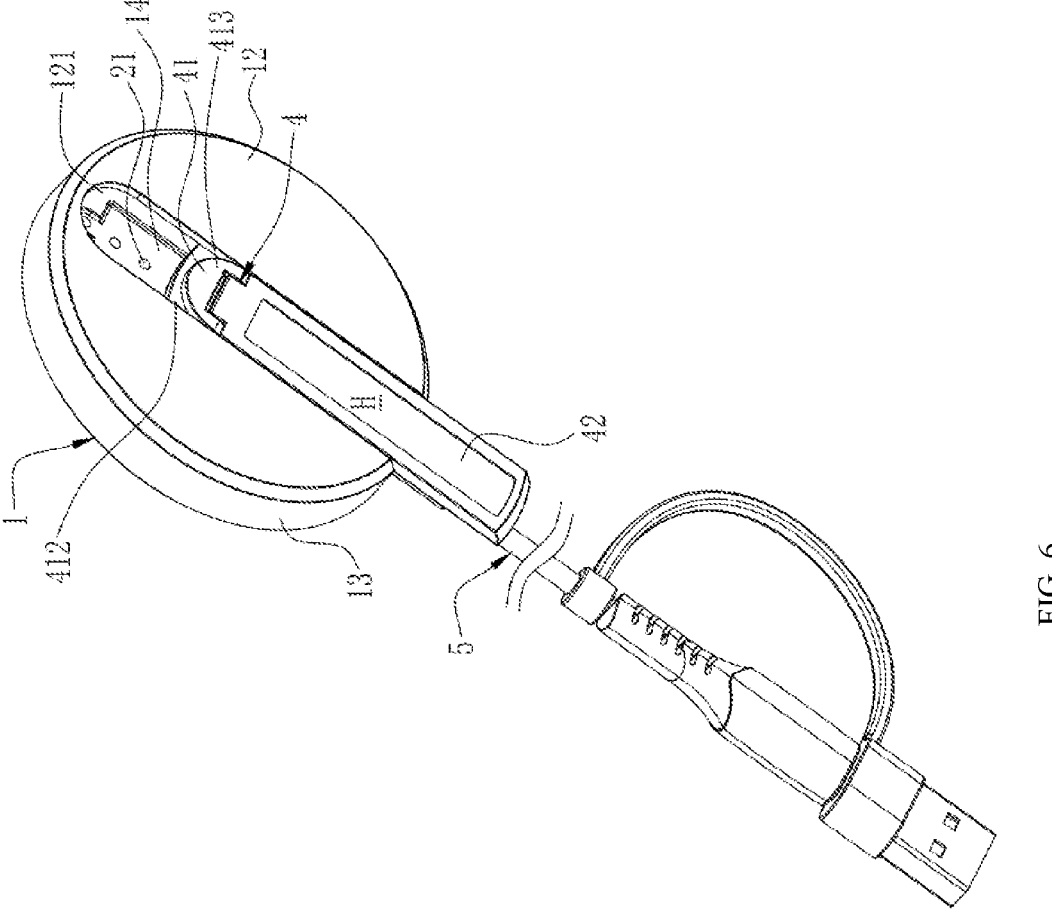
FIG. 6 is a perspective schematic diagram of the wireless charger in which the sliding component slides downwards by half and the supporting component is in the closed form according to one embodiment of the present disclosure.
Figure 7:
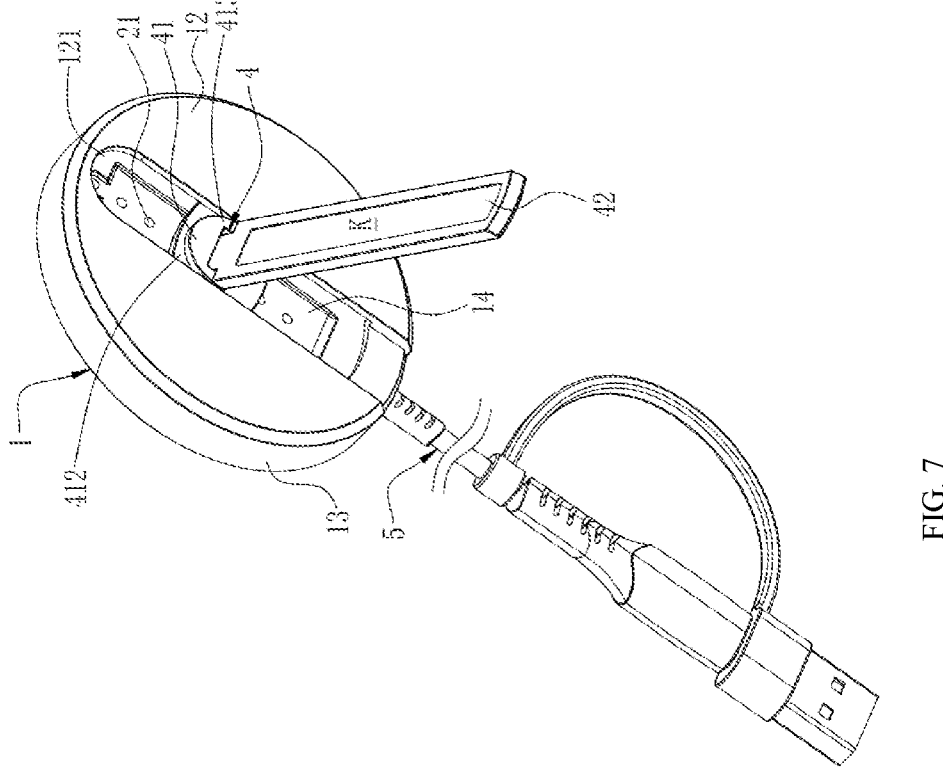
FIG. 7 is a perspective schematic diagram of the wireless charger in which the sliding component slides downwards by half and the supporting component is in the open form according to one embodiment of the present disclosure.
Figure 8:
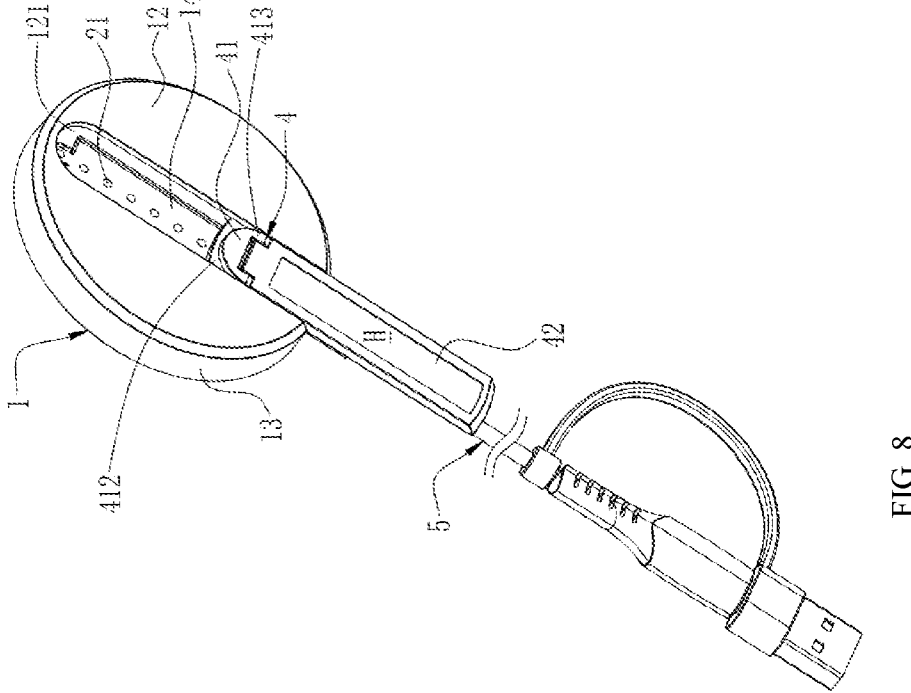
FIG. 8 is a perspective schematic diagram of the wireless charger in which the sliding component slides downwards to a bottom and the supporting component is in the closed form according to one embodiment of the present disclosure.
Figure 9:
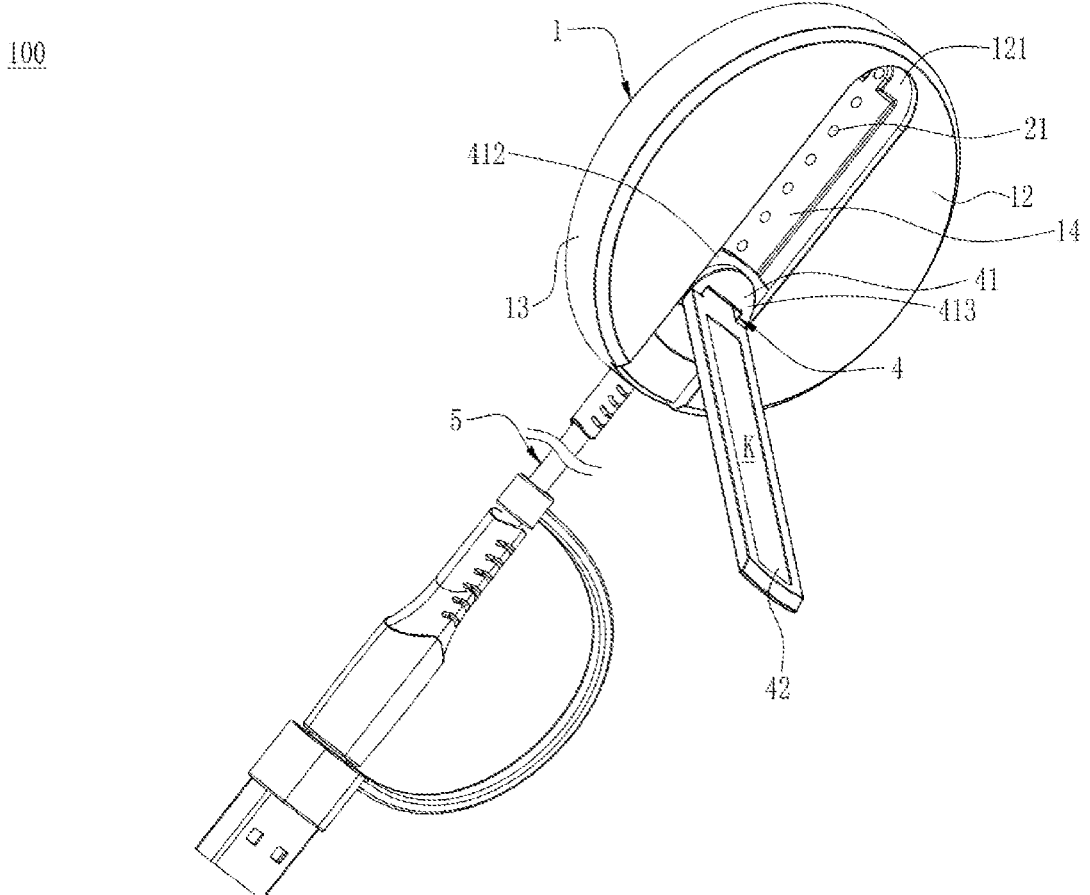
FIG. 9 is a perspective schematic diagram of the wireless charger in which the sliding component slides downwards to the bottom and the supporting component is in the open form according to one embodiment of the present disclosure.

FIG. 1 is a schematic diagram of the wireless charger 100 in which the sliding component 41 does not slide downwards and the supporting component 42 is in the closed form H and FIG. 5 is a schematic diagram of the wireless charger 100 in which the sliding component 41 does not slide downwards and the supporting component 42 is in the open form K. FIG. 6 is a schematic diagram of the wireless charger 100 in which the sliding component 41 slides downwards by half and the supporting component 42 is in the closed form H and FIG. 7 is a schematic diagram of the wireless charger 100 in which the sliding component 41 slides downwards by half and the supporting component 42 is in the open form K. FIG. 8 is a schematic diagram of the wireless charger 100 in which the sliding component 41 slides downwards to a bottom and the supporting component 42 is in the closed form H and FIG. 9 is a schematic diagram of the wireless charger 100 in which the sliding component 41 slides downwards to the bottom and the supporting component 42 is in the open form K. The wireless charger 100 is generally attached to an intermediate region of the electronic equipment. As an example, the supporting component 42 is pivoted outwards by 60 degrees to enable the supporting component 42 in the open form K. When the sliding component 41 does not slide downwards or is slid downwards by half, and when the supporting component 42 is in the open form K, the electronic equipment is vertically placed, so the user is able to view messages, reply to messages, browse web pages, etc. while charging. When the sliding component 41 is slid downwards to the bottom, and the supporting component 42 is in the open form K, the electronic equipment is vertically placed, so the user is able to watch vertical films and make video calls. When the supporting component 42 is in the open form K, no matter where the sliding component 41 slides, the electronic equipment is horizontally placed, so the user is able to watch horizontal films. When the supporting component 42 is in the closed form H, no matter where the sliding component 41 slides, the wireless charger 100 is flatly placed. When the supporting component 42 is pivoted outwards by 60 degrees, requirements of various scenes of the user are well met.

Certainly, it should be understood that FIGS. 1, 5, 6, 7, 8, and 9 only show several representative use forms of the adjustment assembly 4, and in fact, the use forms of the adjustment assembly 4 and the corresponding use scenes are not limited thereto. By disposing the adjusting assembly 4, the sliding component 41 is slid up and down, and the supporting component 42 is pivotable outwards, so the supporting component 42 has the closed form H and the open form K relative to the open portion 121. Therefore, a position of the adjusting assembly 4 is changed from two directions, which greatly enriches the use forms of the adjusting assembly 4, thus meeting the using requirements for the wireless charger 100 in different scenes.

The above detailed description is merely an illustration of optional embodiments of the present disclosure, which should not be regarded as a limit to a scope of the present disclosure. Therefore, equivalent technical changes made by the specification and drawings are all included in the scope of the present disclosure.

What is claimed is:

1. A wireless charger configured to charge electronic equipment, comprising:
   a housing;
   a fixing component;
   a coil module; and
   an adjusting assembly;
   wherein the housing comprises a top housing and a bottom housing; the top housing is opposite to the bottom housing, the top housing faces the electronic equipment; an opening portion is formed on an outer surface of the bottom housing;
   the fixing component is accommodated in the housing;
   the coil module is disposed between the top housing and the fixing component;

the adjusting assembly is at least partially slidably connected between the bottom housing and the fixing component, and the adjusting assembly has a closed form and an open form relative to the opening portion;

wherein the adjusting assembly comprises a sliding component and a supporting component totally received in the opening portion formed on an outer surface of the bottom housing; the sliding component is connected to the supporting component; and the supporting component is pivotable relative to the sliding component;

wherein the sliding component and the supporting component do not extend out of an outer side surface of the bottom housing, so that the wireless charger is flatly placed on an external surface.

2. The wireless charger according to claim 1, wherein a plurality of limiting grooves is defined on the fixing component facing the opening portion; an elastic telescopic component is disposed on the sliding component facing the fixing component; the elastic telescopic component is embedded and fixed to any one of the plurality of limiting grooves, so that the sliding component is suspended and limited in any one of the plurality of limiting grooves in a sliding process; or a plurality of elastic telescopic components is disposed on the fixing component facing the opening portion; a limiting groove is defined on the sliding component facing the fixing component; and the limiting groove is embedded and fixed to any one of the plurality of elastic telescopic components, so that the sliding component is suspended and limited by any one of the plurality of elastic telescopic components in the sliding process.

3. The wireless charger according to claim 2, wherein the sliding component is suspended and limited in any one of the plurality of limiting grooves or the sliding component is suspended and limited by any one of the plurality of elastic telescopic components; the supporting component has the closed form and the open form relative to the opening portion.

4. The wireless charger according to claim 3, wherein a first matching portion is disposed on the sliding component; a second matching portion is disposed on the supporting component; and the second matching portion is matched with the first matching portion to limit the supporting component in the open form.

5. The wireless charger according to claim 3, wherein when the supporting component is switched from the closed form to the open form; the supporting component pivots outwards in a range of 0-120 degrees; and at least one pivoting angle enables the supporting component to be in the open form.

6. The wireless charger according to claim 5, wherein the supporting component is pivoted outwards by 60 degrees to be switched from the closed form to the open form.

7. The wireless charger according to claim 3, wherein one end of the opening portion away from the sliding component runs through the bottom housing, so that when the supporting component is in the closed form relative to the opening portion, the sliding component drives the supporting component to slide downwards.

8. The wireless charger according to claim 1, wherein the fixing component is fixed to the bottom housing so as to form a sliding groove between the fixing component and the bottom housing; the sliding component comprises a base portion and a protruding portion; the protruding portion protrudes from the base portion; the base portion is clamped in the sliding groove and is slidable in the sliding groove; and the protruding portion is accommodated in the opening portion.

9. The wireless charger according to claim 8, wherein a shape of the protruding portion and a shape of the supporting component are matched with a shape of the opening portion; and when the base portion does not slide outwards, the protruding portion and the supporting component are accommodated in the opening portion.

10. The wireless charger according to claim 1, wherein a width of the supporting component is less than or equal to a width of the opening portion; and when the sliding component does not slide, the supporting component is accommodated in the opening portion.

* * * * *